US012150216B1

(12) United States Patent
Zhu

(10) Patent No.: US 12,150,216 B1
(45) Date of Patent: Nov. 19, 2024

(54) DRIVING CIRCUIT OF HAND WARMER AND HAND WARMER

(71) Applicant: Guangdong Aoyun Technology Co., Ltd., Huizhou Guangdong (CN)

(72) Inventor: Xueping Zhu, Guangdong (CN)

( * ) Notice: Subject to any disclaimer, the term of this patent is extended or adjusted under 35 U.S.C. 154(b) by 0 days.

(21) Appl. No.: 18/356,793

(22) Filed: Jul. 21, 2023

(30) Foreign Application Priority Data

Jul. 10, 2023 (CN) ......................... 202321806141.3

(51) Int. Cl.
*H05B 1/02* (2006.01)

(52) U.S. Cl.
CPC .................................. *H05B 1/0252* (2013.01)

(58) Field of Classification Search
CPC ...... H05B 1/0252; H05B 45/42; H02J 7/0068
USPC .................................................. 219/507, 533
See application file for complete search history.

(56) References Cited

U.S. PATENT DOCUMENTS

| | | | | |
|---|---|---|---|---|
| 4,855,572 A * | 8/1989 | Wallgren | H05K 13/0486 219/466.1 |
| 9,614,262 B2 * | 4/2017 | Kim | H01M 10/615 |
| 2008/0053979 A1 * | 3/2008 | Toya | A61H 23/0263 219/385 |

FOREIGN PATENT DOCUMENTS

CN 217037476 U * 7/2022 ............... H05B 1/00

OTHER PUBLICATIONS

Machine Translation of CN217037476U (Year: 2024).*

* cited by examiner

*Primary Examiner* — Nathaniel E Wiehe
*Assistant Examiner* — Thomas J Ward

(57) ABSTRACT

The present disclosure discloses a driving circuit of a hand warmer and a hand warmer. The driving circuit of a hand warmer includes a charging control circuit, a heating control unit and a temperature regulating circuit. The temperature regulating circuit is configured to electrically connect the battery and the heating control unit, and includes a main control unit and a stepless regulating device electrically connected with the main control unit, the stepless regulating device is configured to be operated by a user to generate a stepless regulating signal within a preset regulating range. The main control unit is configured to receive the stepless regulating signal to generate a heating control signal and output the heating control signal to the heating control unit, so that the heating control unit outputs a driving signal according to the heating control signal to drive the heating element to heat within a preset temperature range.

7 Claims, 6 Drawing Sheets

61

9

DRIVING CIRCUIT OF HAND WARMER AND HAND WARMER

CROSS-REFERENCE TO RELATED APPLICATIONS

The application claims priority of Chinese patent application CN2023218061413, filed on 2023 Jul. 10, which is incorporated herein by reference in its entireties.

TECHNICAL FIELD

The present disclosure relates to the technical field of hand warmer regulating circuits, in particular to a driving circuit of a hand warmer and a hand warmer.

BACKGROUND

With the development of science and technology, people's requirements for the quality of life are improving. In winter, people feel cold in their hands because of the cold weather, so that hand warmers are popularized and used. However, hand warmers in the market generally use single-key fixed gear switches, which can only realize the temperature regulating of fixed gears. Usually, only the set temperatures of three gears are allowed, especially when the hand warmers are used outdoors. Because of the low outdoor temperature, the selection of fixed gears is likely to lead to the problem that the low gear cannot meet the heating demand, and the high gear results in extremely high temperature. Therefore, there is an urgent need to provide a hand warmer with stepless temperature regulation in the market.

SUMMARY

In view of this, the present disclosure discloses a driving circuit of a hand warmer and a hand warmer.

The present disclosure discloses a driving circuit of a hand warmer, which includes a charging control circuit, a heating control unit, a temperature regulating circuit, which can realize accurate temperature control of the hand warmer.

As the improvement of the present disclosure, the charging control circuit, is configured to electrically connect an external power supply and a battery to receive an external voltage to charge the battery;

The heating control unit is configured to electrically connect the battery and a heating element;

The temperature regulating circuit is configured to electrically connect the battery and the heating control unit, and includes a main control unit and a stepless regulating device electrically connected with the main control unit, the stepless regulating device is configured to be operated by a user to generate a stepless regulating signal within a preset regulating range, and the main control unit is configured to receive the stepless regulating signal to generate a heating control signal and output the heating control signal to the heating control unit, so that the heating control unit outputs a driving signal according to the heating control signal to drive the heating element to heat within a preset temperature range.

As the improvement of the present disclosure, the temperature regulating circuit further includes a temperature sensing element, the temperature sensing element is electrically connected with the main control unit and is configured to sense the temperature of the hand warmer to obtain a temperature sensing signal, and the main control unit is configured to compare the stepless regulating signal with the temperature sensing signal to output the heating control signal.

As the improvement of the present disclosure, the stepless regulating device includes an adjustable resistor, the adjustable end of the adjustable resistor is connected to an input end of the stepless regulating signal of the main control unit, a first end of the adjustable resistor is configured to receive an operating voltage, the adjustable end of the adjustable resistor is configured to receive the stepless regulating signal, and a second end of the adjustable resistor is grounded via a first grounding resistor.

As the improvement of the present disclosure, the stepless regulating device includes an encoder, a first end of the encoder receives the operating voltage via a first connecting resistor, a second end of the encoder is connected to a power supply end of the main control unit via a second connecting resistor and is connected to an input end of the stepless regulating signal of the main control unit via a third connecting resistor, and a grounding end of the encoder is grounded.

As the improvement of the present disclosure, one end of the temperature sensing element is connected with the main control unit and outputs the temperature sensing signal, and the other end thereof receives the operating voltage via the second connecting resistor; alternatively, one end of the temperature sensing element is grounded, and the other end thereof receives the operating voltage via the second connecting resistor, and the other end of the temperature sensing element is further electrically connected with the main control unit and outputs the temperature sensing signal.

As the improvement of the present disclosure, the heating element includes a first heater and a second heater, the first heater and the second heater are provided at different positions of the hand warmer, respectively, and are electrically connected, the main control unit includes output ends of two heating control signals for outputting the two heating control signals, respectively, the main control unit includes input ends of two temperature sensing signals, the temperature sensing element is electrically connected with the input ends of the two temperature sensing signals, respectively; the heating control unit includes input ends of two heating signals, which receive the two heating control signals, respectively, and output the driving signal to jointly drive the first heater and the second heater.

As the improvement of the present disclosure, the driving circuit of the hand warmer further includes a charge-discharge protection chip, an anode of the battery is configured to connect a power supply end VDD of the charge-discharge protection chip via a first protection resistor, a cathode of the battery is configured to electrically connect a driving end VT and a grounding end GND of the charge-discharge protection chip, a detection pin VM of the charge-discharge protection chip is grounded; and a capacitor is further connected between the cathode of the power supply and the power supply end VDD of the charge-discharge protection chip.

As the improvement of the present disclosure, the driving circuit of the hand warmer further includes a charging protection circuit, the charging protection circuit is electrically connected with the battery and the main control unit and is configured to cut off the electrical connection between the battery and the temperature regulating circuit when detecting that the charging control circuit receives the external voltage, so that the temperature regulating circuit and the heating control unit stop operating when the battery is charged.

As the improvement of the present disclosure, the charging protection circuit includes a first switch, a second switch and a third switch, a first connecting end of the first switch is configured to connect the anode of the battery, a second connecting end of the first switch is configured to electrically connect the power supply end of the main control unit to output the operating voltage, a control end of the first switch is grounded via a first resistor, the control end of the second switch is configured to connect the charging control circuit via a second resistor to receive the external voltage, the first connecting end of the second switch is connected to the control end of the third switch, the second connecting end of the second switch is grounded, the first connecting end of the third switch is connected to the anode of the battery, the second connecting end of the third switch is connected to the control end of the first switch; the first switch is a PMOS tube, the second switch is an NPN triode, the third switch is a PNP triode; a diode is provided between the second connecting end of the third switch and the control end of the first switch; and a manual control switch button is provided between the first connecting end of the first switch and the anode of the battery.

The present disclosure also provides a hand warmer, the hand warmer including the driving circuit of the hand warmer in any of the above embodiments, the battery and the heating element.

Compared with the prior art, in the driving circuit of a hand warmer in embodiment above, a user can operate the stepless regulating device to generate a stepless regulating signal within a preset regulating range. The main control unit receives the stepless regulating signal to generate a heating control signal and outputs the heating control signal to the heating control unit, so that the heating control unit outputs a driving signal according to the heating control signal to drive the heating element to heat within a preset temperature range. Accurate temperature control of the hand warmer is realized, ensuring that the hand warmer can quickly meet the temperature requirements of users at any point and is kept at an ideal temperature continuously, thus increasing the comfort and satisfaction of users.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The following will make a clear and complete description of the technical solutions in the embodiments of the present disclosure in combination with the drawings in the embodiments of the present disclosure. Obviously, the described embodiments are only part of the embodiments of the present disclosure, not all of them. Based on the embodiments in present disclosure, all other embodiments obtained by those of ordinary skill in the art without creative work shall fall within the protection scope of the present disclosure.

In order to make the aims, technical solution and advantages of the present disclosure will be clearly, the present disclosure is further described below in combination with accompanying drawings and implementations.

The terms "first", "second" and "third" in the specification and claim of the present disclosure and the attached drawings are used to distinguish different objects rather than to describe a specific sequence. Furthermore, the term "includes", and any variation thereof, is intended to cover non-exclusive inclusion. For example, a process, method, system, product or device comprising a series of steps or units is not limited to the listed steps or units, but optionally also includes steps or units not listed, or optionally includes other steps or units inherent to those processes, methods, products or devices.

Figure 1:
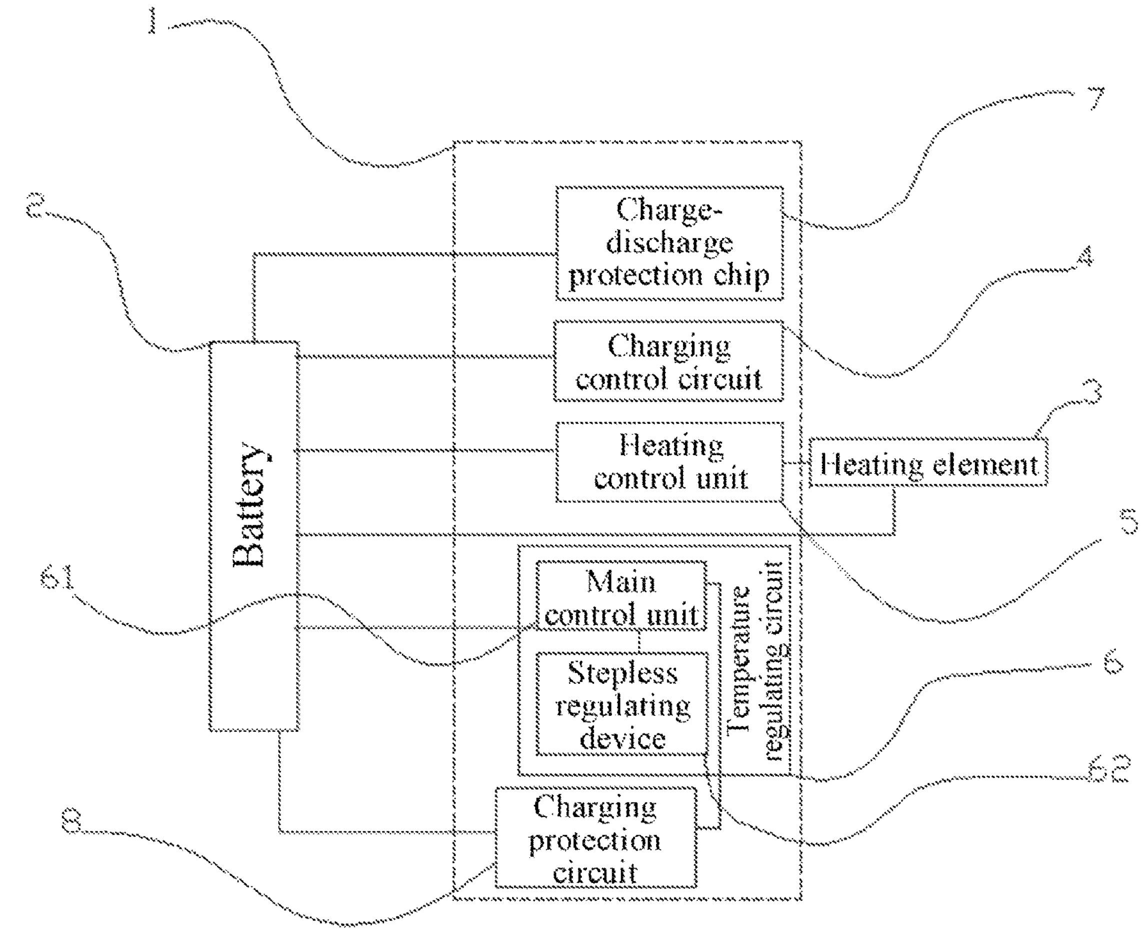
FIG. 1 is an overall block diagram of a hand warmer according to the present disclosure.

As shown in FIG. 1, an embodiment of the present application provides a hand warmer. The hand warmer comprises a driving circuit 1, a battery 2 and a heating element 3. The driving circuit comprises a charging control circuit 4, a heating control unit 5 and a temperature regulating circuit 6. It can be understood that the main function of the hand warmer is the heating function, which provides continuous and moderate heat to keep hands warm through the built-in heating element 3. The hand warmer may comprise a housing, a battery 2 provided in the housing and at least one heating element 3. At least part of the driving circuit 1 can be provided on at least one circuit board, and the housing can be provided with input/output port devices and switch buttons electrically connected with the driving circuit 1.

Embodiment 1

Figure 2:
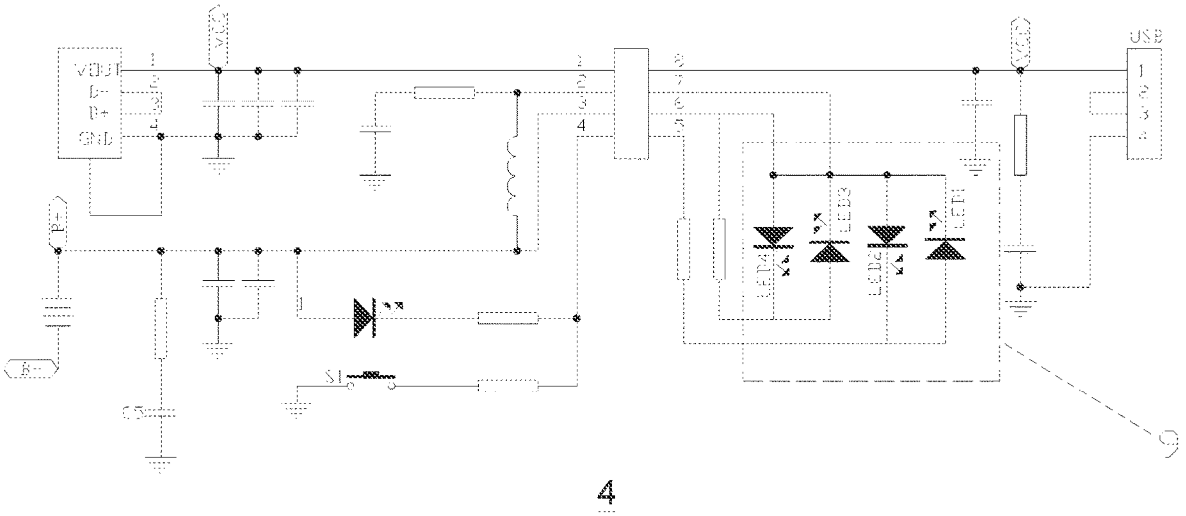
FIG. 2 is a circuit diagram of a charging control circuit of a driving circuit of a hand warmer according to the present disclosure.
Figure 3:
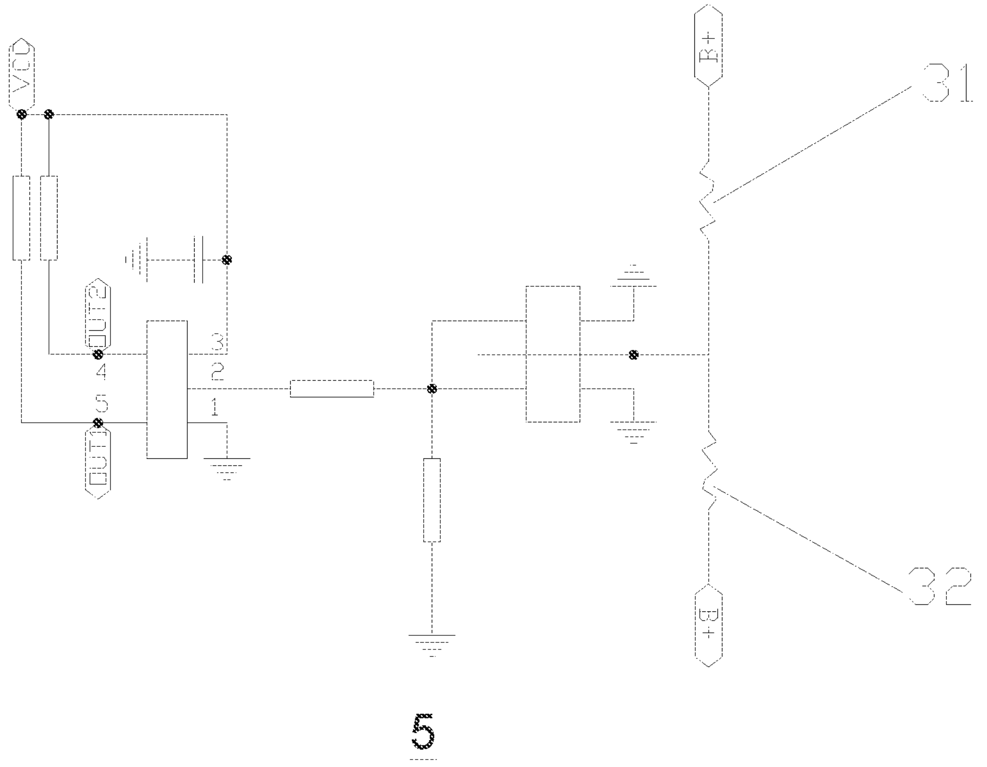
FIG. 3 is a circuit diagram of a heating control unit of a driving circuit of a hand warmer according to the present disclosure.
Figure 4:
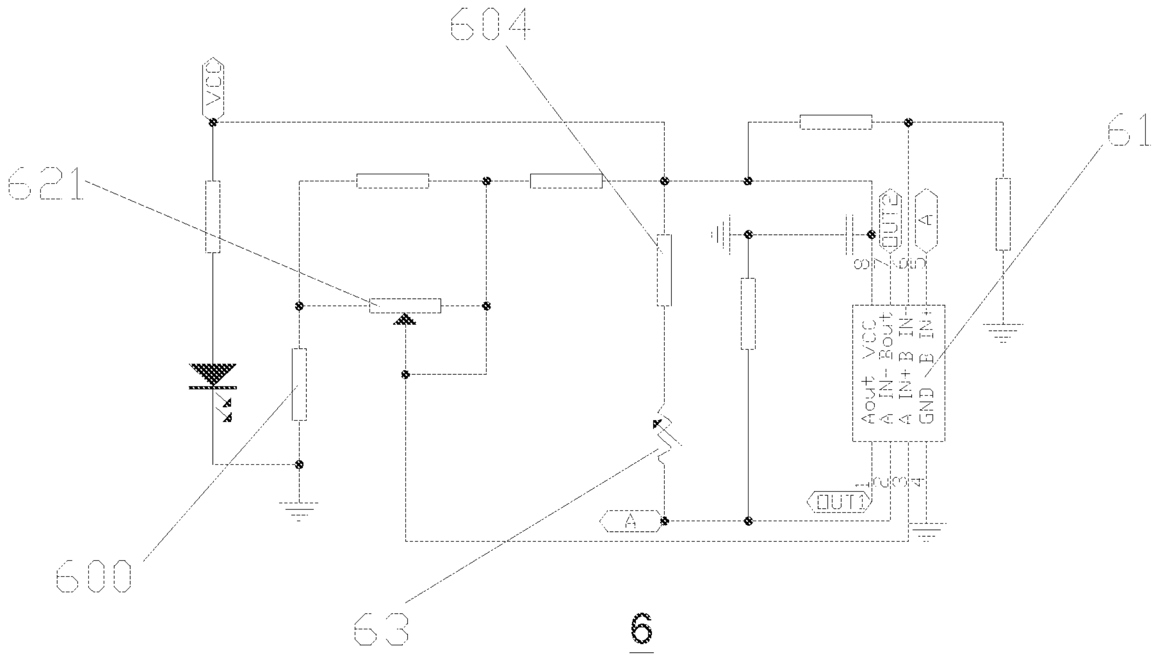
FIG. 4 is a circuit diagram of a temperature regulating circuit of a driving circuit of a hand warmer according to the present disclosure.
Figure 5:
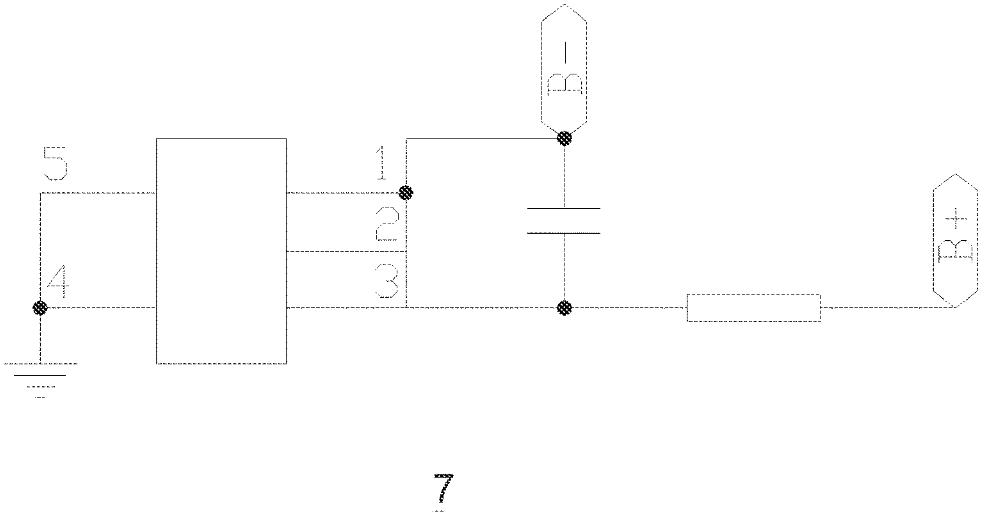
FIG. 5 is a circuit diagram of a charge-discharge protection chip of a driving circuit of a hand warmer according to the present disclosure.
Figure 6:
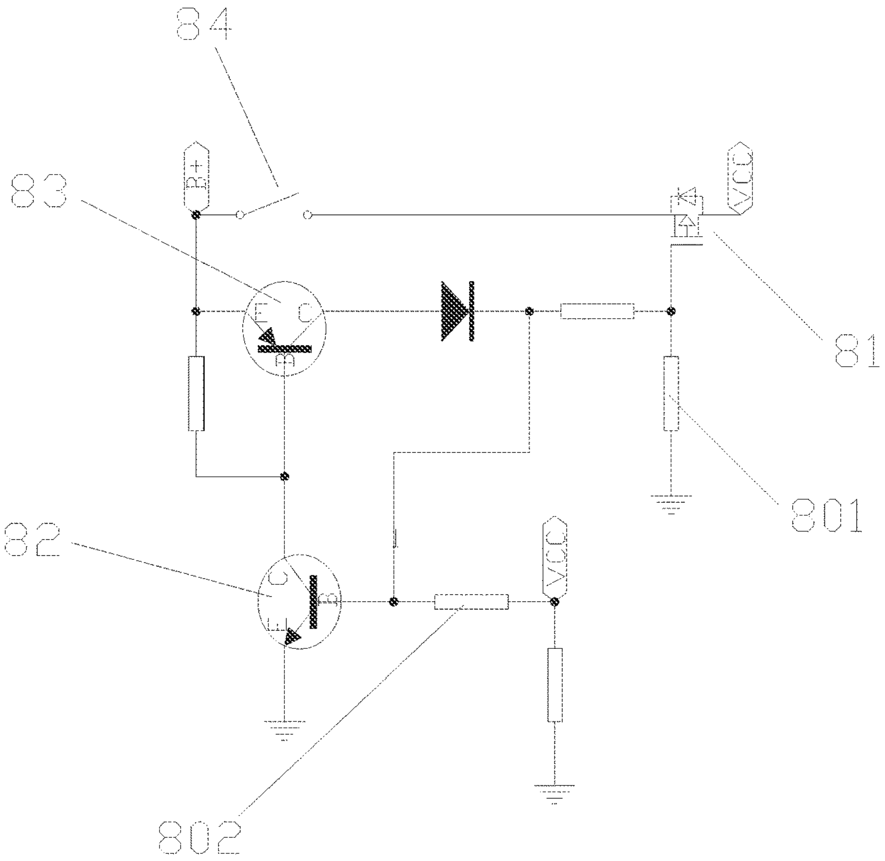
FIG. 6 is a circuit diagram of a charging protection module of a driving circuit of a hand warmer according to the present disclosure.
Figure 7:
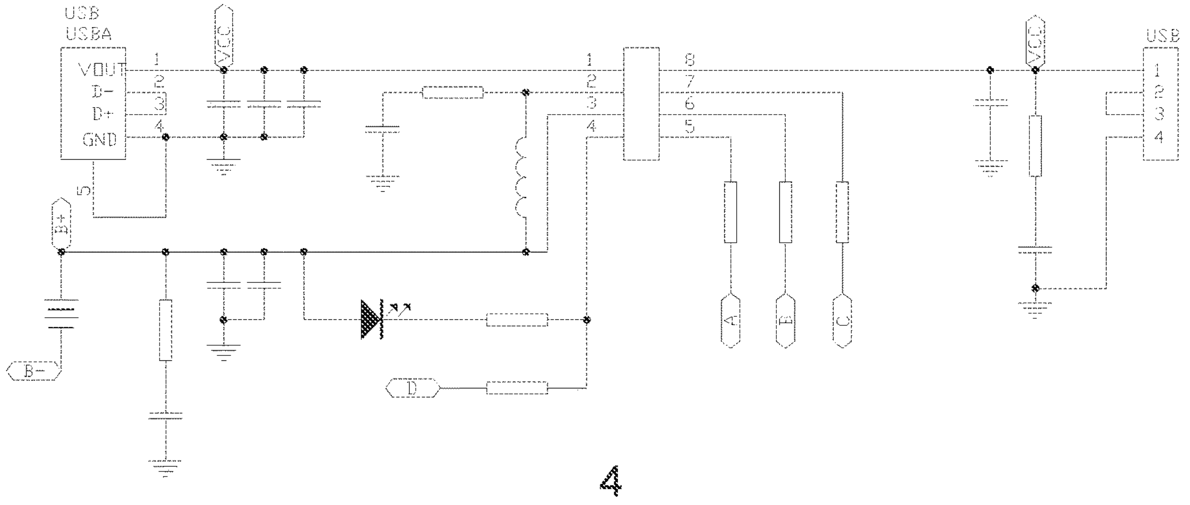
FIG. 7 is a circuit diagram of another charging control circuit of a driving circuit of a hand warmer according to the present disclosure.
Figure 8:
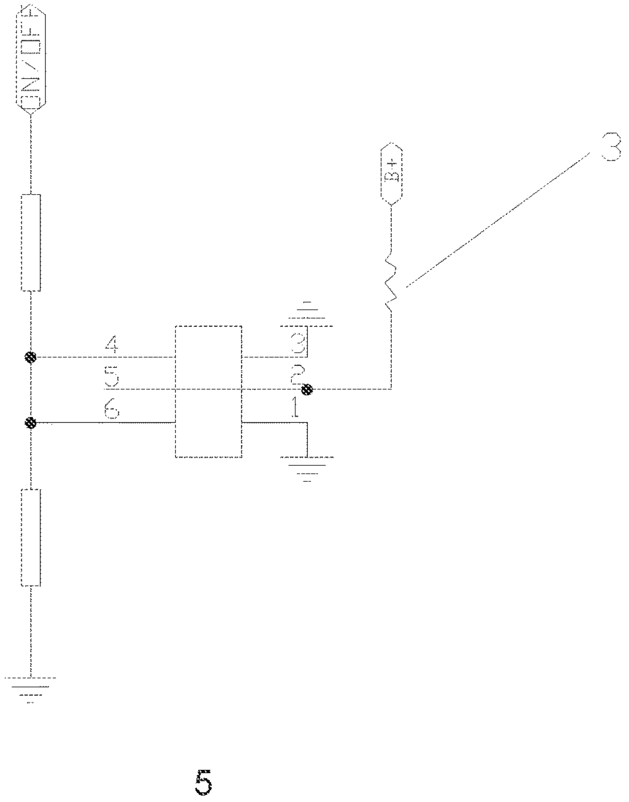
FIG. 8 is a circuit diagram of another heating control unit of a driving circuit of a hand warmer according to the present disclosure.
Figure 9:
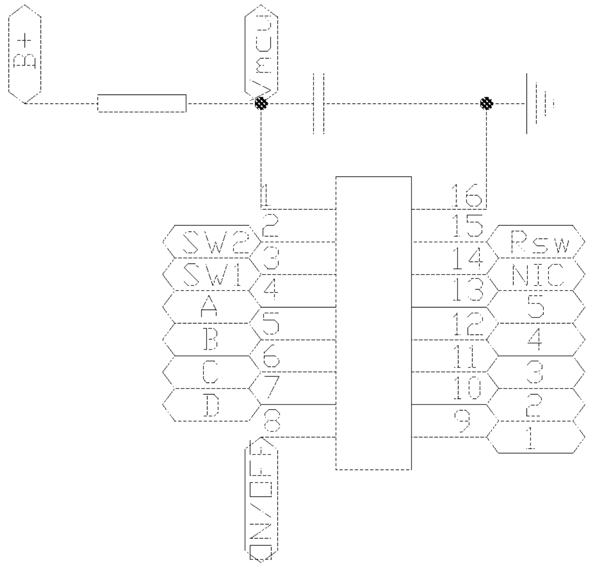
FIG. 9 is a circuit diagram of a main control unit in a temperature regulating circuit of a driving circuit of a hand warmer according to the present disclosure.
Figure 10:
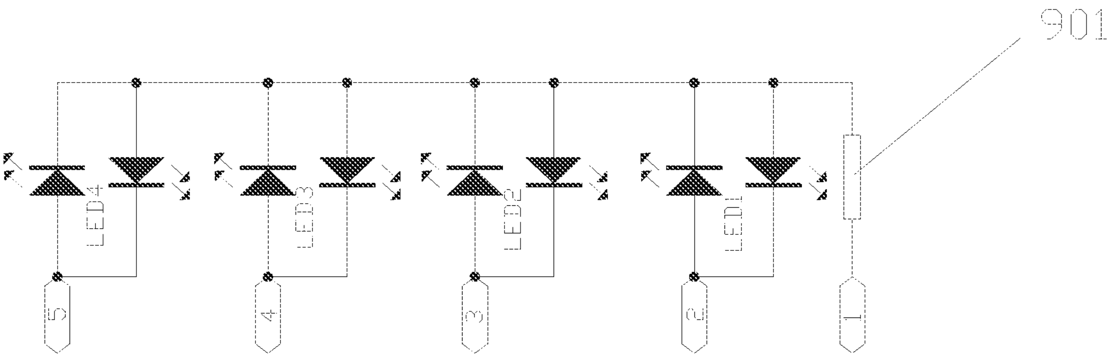
FIG. 10 is a circuit diagram of a temperature display module of a driving circuit of a hand warmer according to the present disclosure.
Figure 11:
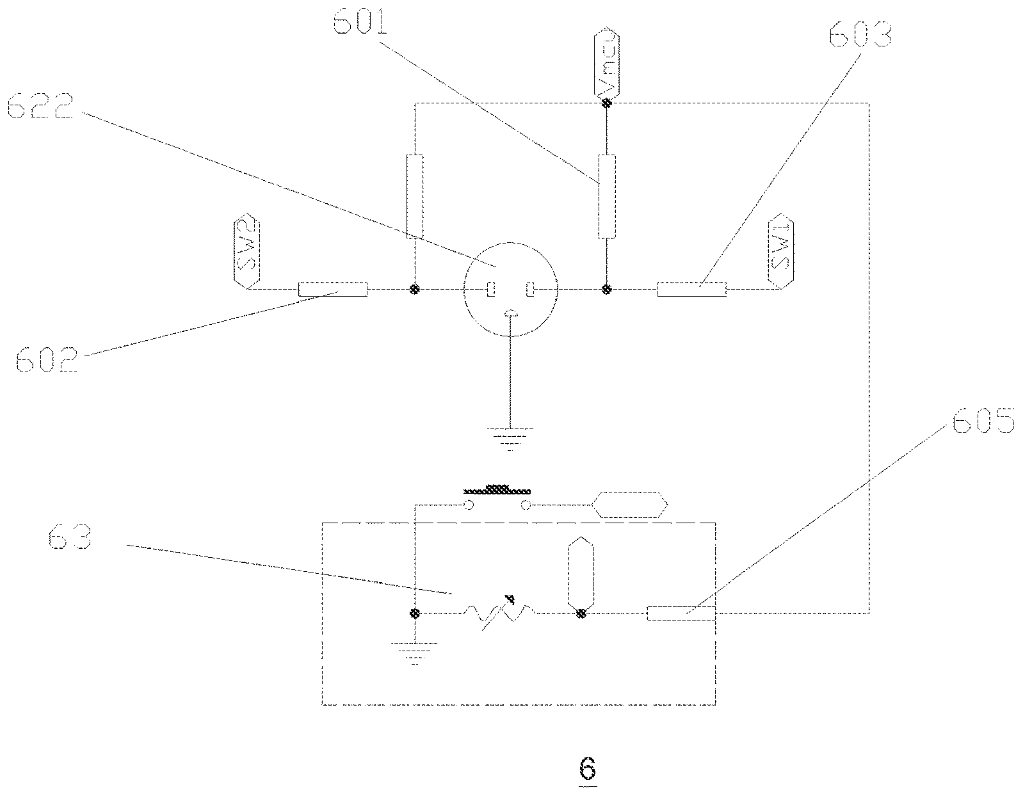
FIG. 11 is a circuit diagram of another temperature regulating circuit of a driving circuit of a hand warmer according to the present disclosure.
Figure 12:
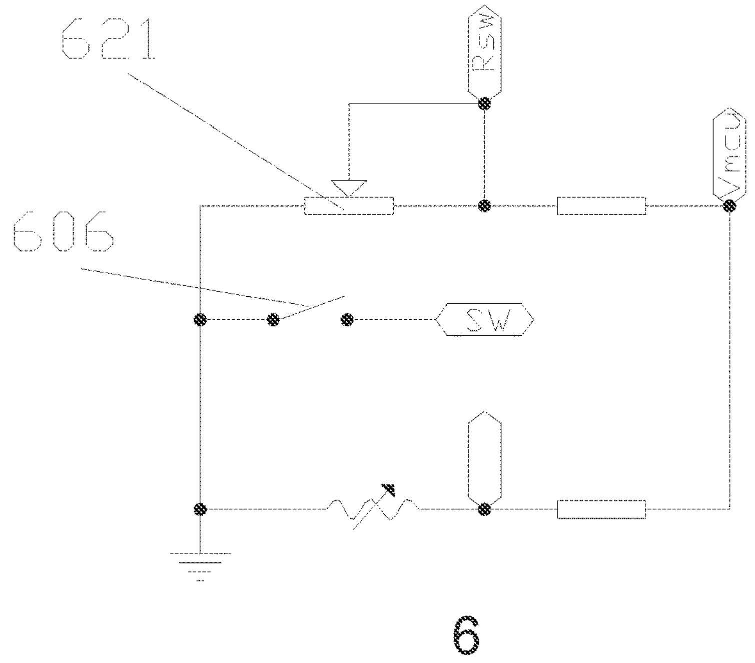
FIG. 12 is a circuit diagram of another temperature regulating circuit of a driving circuit of a hand warmer according to the present disclosure.

As shown in FIGS. 2 to 6, in this embodiment, the charging control circuit 4 is configured to electrically connect an external power supply and the battery 2 to receive an external voltage to charge the battery 2. The heating control unit 5 is configured to electrically connect the battery 2 and the heating element 3. The charging control circuit is further provided with a temperature display module 9. In this embodiment, four LED display lamps are provided to display the temperature. As shown in FIG. 2, every two LED lamps form a group. The cathode of one LED lamp is connected with the anode of the other LED lamp. A fifth pin and a sixth pin of the main control chip in the charging control circuit are connected in series with a group of LED lamps, respectively. With the above structure, it is convenient for users to check and adjust the temperature of the hand warmer, avoiding superheating or supercooling, and improving comfort and safety.

In this embodiment, the temperature regulating circuit 6 is configured to electrically connect the battery 2 and the heating control unit 5. The temperature regulating circuit 6 comprises a main control unit 61 and a stepless regulating device 62 electrically connected with the main control unit. A user can operate the stepless regulating device 62 to generate a stepless regulating signal within a preset regulating range. The main control unit 61 receives the stepless regulating signal to generate a heating control signal and outputs the heating control signal to the heating control unit 5, so that the heating control unit 5 outputs a driving signal according to the heating control signal to drive the heating element 3 to heat within a preset temperature range. The main control unit 61 is an LM393 chip with eight pins, in which the first pin of the main control unit 61 is an output pin OUT1, and the seventh pin of the main control unit 61 is an output pin OUT2, which are connected with the fifth pin and the fourth pin of the heating chip in the heating control unit 5, respectively. With the above structure, accurate temperature control of the hand warmer is realized, ensuring that the hand warmer can quickly meet the temperature requirements of users at any point and is kept at an ideal temperature continuously, thus increasing the comfort and satisfaction of users.

In this embodiment, the temperature regulating circuit 6 further comprises a temperature sensing element 63. The temperature sensing element 63 is electrically connected with the main control unit 61 and is configured to sense the temperature of the hand warmer to obtain a temperature sensing signal. The main control unit 61 is configured to compare the stepless regulating signal with the temperature sensing signal to output the heating control signal. The temperature sensing element 63 is an NTC temperature sensor. The NTC temperature sensor is a thermistor with high sensitivity and fast response. With the above structure, the hand warmer can effectively and quickly stop heating when reaching the required temperature and automatically heat when it is lower than the required temperature.

In this embodiment, the stepless regulating device 62 comprises an adjustable resistor 621. The adjustable end of the adjustable resistor 621 is connected to an input end of the stepless regulating signal of the main control unit 61. A first end of the adjustable resistor 621 is configured to receive an operating voltage VCC. The adjustable end of the adjustable resistor 621 is configured to receive the stepless regulating signal, and a second end of the adjustable resistor 621 is grounded via a first grounding resistor 600. The adjustable end of the adjustable resistor 621 is connected to the third pin of the main control unit. With the above structure, the set temperature and NTC detection temperature can be adjusted effectively and quickly by using the sliding adjustable resistor, and the functional effect that the hand warmer accurately controls the temperature and keeps it at the preset temperature continuously is realized.

In this embodiment, one end of the temperature sensing element 63 is connected with the main control unit 61 and outputs the temperature sensing signal, and the other end thereof receives the operating voltage VCC via the second connecting resistor 604. The output end of the temperature sensing element 63 is connected to a fifth pin of the main control unit 61, and the other end thereof is connected to the power supply VCC through the resistor R16. The power supply VCC is configured to supply power to the temperature sensing element 63. With the above structure, the temperature sensing element 63 is an NTC temperature sensor, which can quickly respond to the temperature change and accurately measure and control the temperature, thus effectively realizing the temperature sensing function of the hand warmer.

In this embodiment, the heating element 3 comprises a first heater 31 and a second heater 32. The first heater 31 and the second heater 32 are provided at different positions of the hand warmer, respectively, and are electrically connected. The main control unit 61 comprises output ends of two heating control signals for outputting the two heating control signals, respectively. The main control unit 61 comprises input ends of two temperature sensing signals. The temperature sensing element 63 is electrically connected with the input ends of the two temperature sensing signals, respectively. The heating control unit 5 comprises input ends of two heating signals, which receive the two heating control signals, respectively, and output the driving signal to jointly drive the first heater 31 and the second heater 32. The first heater 31 and the second heater 32 can be connected in parallel or in series in a driving circuit. With the above structure, the heating control unit 5 can quickly drive the heating element 3 to start after receiving the heating signal input by the main control unit 61, so that the hand warmer can quickly raise the temperature and heat, and the user can quickly adjust the temperature at any point, thus improving the use experience and satisfaction of users.

In this embodiment, the driving circuit of the hand warmer further comprises a charge-discharge protection chip 7. An anode B+ of the battery is configured to connect a power supply end VDD of the charge-discharge protection chip 7 via a first protection resistor, and a cathode B− of the battery is configured to electrically connect a driving end VT and a grounding end GND of the charge-discharge protection chip. A detection pin VM of the charge-discharge protection chip 7 is grounded. A capacitor is further connected between the B− cathode of the power supply and the power supply end VDD of the charge-discharge protection chip. With the above structure, the charge and discharge protection chip 7 can manage the charge and discharge of the battery, ensure the safety of the battery, prevent the occurrence of overcharge, overdischarge, overtemperature, overvoltage, overload and short circuit, and prolong the life of the battery and the hand warmer.

In this embodiment, the driving circuit of the hand warmer further comprises a charging protection circuit 8. The charging protection circuit is electrically connected with the battery 2 and the main control unit 61 and is configured to cut off the electrical connection between the battery and the temperature regulating circuit 6 when detecting that the charging control circuit 4 receives the external voltage, so that the temperature regulating circuit 6 and the heating control unit 5 stop operating when the battery is charged. With the above structure, the charging protection circuit 8 supplies power to the lithium battery or the storage battery.

The design of the charging protection circuit 8 effectively realizes that the heating of the product will be automatically stopped regardless of whether the hand warmer is turned on while being charged or the hand warmer is charged while being turned on. After being charged in the ON state, the hand warmer needs to be turned on and off again after being fully charged, so as to being heated again, thus preventing the hand warmer from being heated during charging, and greatly improving the safety and reliability of the hand warmer.

In this embodiment, the charging protection circuit 8 comprises a first switch 81, a second switch 82 and a third switch 83. A first connecting end of the first switch 81 is configured to connect the anode B+ of the battery. A second connecting end of the first switch 81 is configured to electrically connect the power supply end of the main control unit 61 to output the operating voltage VCC. A control end of the first switch 81 is grounded via a first resistor 801. The control end of the second switch 82 is configured to connect the charging control circuit via a second resistor 802 to receive the external voltage. The first connecting end of the second switch 82 is connected to the control end of the third switch 83. The second connecting end of the second switch 82 is grounded. The first connecting end of the third switch 83 is connected to the anode B+ of the battery. The second connecting end of the third switch 83 is connected to the control end of the first switch 81. The first switch 81 is a PMOS tube. The control end of the first switch 81 is the G pole of the PMOS tube, the first connecting end of the first switch 81 is the S pole of the PMOS tube, and the second connecting end of the first switch 81 is the D pole of the PMOS tube. The second switch 82 is an NPN triode. The first connecting end of the second switch 82 is a collector C of the NPN triode, the second connecting end of the second switch 82 is an NPN triode, and the third connecting end of the second switch 82 is an emitter E of the NPN triode. The third switch 83 is a PNP triode. The first connecting end of the third switch 83 is the emitter E of the PNP triode, and the second connecting end of the third switch 83 is the collector C of the PNP triode. A diode is provided between the second connecting end of the third switch 83 and the control end of the first switch 81. A manual control switch button 84 is provided between the first connecting end of the first switch 81 and the anode B+ of the battery. With the above structure, the safety and reliability of the hand warmer are effectively improved.

Embodiment 2

As shown in FIGS. 5 to 11, in this embodiment, the principles of the charge-discharge protection chip 7 and the charge protection circuit 8 are basically the same as those of Embodiment 1, and the same parts will not be described here. The differences are mainly described hereinafter.

This embodiment is the same as Embodiment 1 in the following aspects. The charging control circuit 4 is configured to electrically connect an external power supply and the battery 2 to receive an external voltage to charge the battery 2. The heating control unit 5 is configured to electrically connect the battery 2 and the heating element 3. The temperature regulating circuit 6 is configured to electrically connect the battery 2 and the heating control unit 5. The temperature regulating circuit 6 comprises a main control unit 61 and a stepless regulating device 62 electrically connected with the main control unit. A user can operate the stepless regulating device 62 to generate a stepless regulating signal within a preset regulating range. The main control unit 61 receives the stepless regulating signal to generate a heating control signal and outputs the heating control signal to the heating control unit 5, so that the heating control unit 5 outputs a driving signal according to the heating control signal to drive the heating element 3 to heat within a preset temperature range. The difference from Embodiment 1 lies in the following aspects. The main control unit 61 is an MCU chip with 16 pins. The eighth pin of the main control unit 61 is a switch pin, which is connected with the fourth pin of the heating chip in the heating control unit 5. With the above structure, accurate temperature control of the hand warmer is realized, ensuring that the hand warmer can quickly meet the temperature requirements of users at any point and is kept at an ideal temperature continuously, thus increasing the comfort and satisfaction of users.

Further, in this embodiment, the driving circuit of the hand warmer further comprises a temperature display module 9. The temperature display module 9 can select an LED lamp display or a digital display. In this embodiment, the LED display lamp is taken as an example to display real-time temperature data. The tenth pin, the eleventh pin, the twelfth pin and the thirteenth pin of the main control unit 5 are connected with different groups of LED display lamps, respectively. The ninth pin of the main control unit 5 connects a plurality of LED lamps in series through a first resistor 901. Every two LED lamps form a group. The cathode of one LED lamp is connected with the anode of the other LED lamp. The remaining cathode of one LED lamp is connected with the cathode of the other LED lamp and the first resistor 901. With the above structure, it is convenient for users to check and adjust the temperature of the hand warmer, avoiding superheating or supercooling, and improving comfort and safety.

Further, in this embodiment, the stepless regulation device 62 comprises an encoder 622. A first end of the encoder 622 receives the operating voltage VCC via a first connecting resistor 601. A second end of the encoder 622 is connected to a power supply end of the main control unit 61 via a second connecting resistor 602 and is connected to an input end of the stepless regulating signal of the main control unit 61 via a third connecting resistor 603. A grounding end of the encoder 622 is grounded. The encoder 622 is preferably a two-phase encoder. The first end of the encoder 622 is connected to the first pin of the main control unit through the first connecting resistor 601. The second end of the encoder is connected to the second pin of the main control unit through the second connecting resistor 602, and the second end is connected to the third pin of the main control unit through the third connecting resistor 603. The encoder 622 sends a stepless regulation signal to the main control unit 61 every time it rotates. The main control unit 5 judges whether it is necessary to increase or decrease the temperature by receiving the signal from the encoder 622, so as to change the output temperature. This principle is the same as that of automobile air conditioning control. With the above structure, the set temperature and NTC detection temperature can be adjusted effectively and quickly by using the uniform linear adjustment of the encoder 622, and the functional effect that the hand warmer accurately controls the temperature and keeps it at the preset temperature continuously is realized.

Further, in this embodiment, the temperature regulating circuit 6 further comprises a temperature sensing element 63. The temperature sensing element 63 is electrically connected with the main control unit 61 and is configured to sense the temperature of the hand warmer to obtain a temperature sensing signal. The main control unit 61 is configured to compare the stepless regulating signal with the temperature sensing signal to output the heating control signal. One end of the temperature sensing element 63 is grounded, and the other end thereof receives the operating voltage VCC via the second connecting resistor 605. The other end of the temperature sensing element 63 is further electrically connected with the main control unit 61 and outputs the temperature sensing signal. With the above structure, the temperature sensing element 63 is an NTC temperature sensor, which can quickly respond to the temperature change and accurately measure and control the temperature, thus effectively realizing the temperature sensing function of the hand warmer.

Further, in this embodiment, there is one heating element 3. The main control unit 61 comprises an output end of the heating control signal for outputting the heating control signal. The main control unit 61 comprises an input end of the temperature sensing signal. The temperature sensing element 63 is electrically connected with the input end of the temperature sensing signal. The heating control unit 5 comprises an input end of the heating signal, which receives the heating control signal and outputs the driving signal to jointly drive the heating element 3. With the above structure, the heating control unit 5 can quickly drive the heating element 3 to start after receiving the heating signal input by the main control unit 61, so that the hand warmer can quickly raise the temperature and heat, and the user can quickly adjust the temperature at any point, thus improving the use experience and satisfaction of users.

Embodiment 3

As shown in FIGS. 5 to 10 and 12, in this embodiment, the principles of the charge-discharge protection chip 7, the charge protection circuit 8, the charge control circuit 4, the heating control circuit 5, the temperature sensing element 63 and the main control unit 61 in the temperature regulating circuit 6 are basically the same as those in Embodiment 2, and the same parts will not be described here.

This embodiment is different from Embodiment 2 in the following aspects. The stepless regulating device 62 comprises an adjustable resistor 621. The adjustable end of the adjustable resistor 621 is connected to an input end of the stepless regulating signal of the main control unit 61. A first end of the adjustable resistor 621 is configured to receive an operating voltage VCC. The adjustable end of the adjustable resistor 621 is configured to receive the stepless regulating signal, and a second end of the adjustable resistor 621 is grounded. The adjustable end of the adjustable resistor 621 is connected to the fifteenth pin of the main control unit 61. A manual switch 606 is provided between the main control unit 61 and the adjustable resistor 621. With the above structure, the set temperature and NTC detection temperature can be adjusted effectively and quickly by using the sliding adjustable resistor, and the functional effect that the hand warmer accurately controls the temperature and keeps it at the preset temperature continuously is realized.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A driving circuit of a hand warmer, wherein the driving circuit of the hand warmer comprises:

a charging control circuit, which is configured to electrically connect an external power supply and a battery to receive an external voltage to charge the battery;

a heating control unit, which is configured to electrically connect the battery and a heating element;

a temperature regulating circuit, which is configured to electrically connect the battery and the heating control unit, and comprises a main control unit and a stepless regulating device electrically connected with the main control unit, wherein the stepless regulating device is configured to be operated by a user to generate a stepless regulating signal within a preset regulating range, and the main control unit is configured to receive the stepless regulating signal to generate a heating control signal and output the heating control signal to the heating control unit, so that the heating control unit outputs a driving signal according to the heating control signal to drive the heating element to heat within a preset temperature range, wherein the stepless regulating device comprises an encoder, a first end of the encoder receives the operating voltage via a first connecting resistor, a second end of the encoder is connected to a power supply end of the main control unit via a second connecting resistor and is connected to an input end of the stepless regulating signal of the main control unit via a third connecting resistor, and a grounding end of the encoder is grounded.

2. The driving circuit of the hand warmer according to claim 1, wherein the temperature regulating circuit further comprises a temperature sensing element, the temperature sensing element is electrically connected with the main control unit and is configured to sense the temperature of the hand warmer to obtain a temperature sensing signal, and the main control unit is configured to compare the stepless regulating signal with the temperature sensing signal to output the heating control signal.

3. The driving circuit of the hand warmer according to claim 2, wherein one end of the temperature sensing element is connected with the main control unit and outputs the temperature sensing signal, and the other end thereof receives the operating voltage via the second connecting resistor; alternatively, one end of the temperature sensing element is grounded, and the other end thereof receives the operating voltage via the second connecting resistor, and the other end of the temperature sensing element is further electrically connected with the main control unit and outputs the temperature sensing signal.

4. The driving circuit of the hand warmer according to claim 3, wherein the heating element comprises a first heater and a second heater, the first heater and the second heater are provided at different positions of the hand warmer, respectively, and are electrically connected, the main control unit comprises output ends of two heating control signals for outputting the two heating control signals, respectively, the main control unit comprises input ends of two temperature sensing signals, the temperature sensing element is electrically connected with the input ends of the two temperature sensing signals, respectively; the heating control unit comprises input ends of two heating signals, which receive the two heating control signals, respectively, and output the driving signal to jointly drive the first heater and the second heater.

5. The driving circuit of the hand warmer according to claim 1, wherein the driving circuit of the hand warmer further comprises a charging protection circuit, the charging protection circuit is electrically connected with the battery and the main control unit and is configured to cut off the electrical connection between the battery and the temperature regulating circuit when detecting that the charging control circuit receives the external voltage, so that the temperature regulating circuit and the heating control unit stop operating when the battery is charged.

6. A driving circuit of a hand warmer, wherein the driving circuit of the hand warmer comprises:

a charging control circuit, which is configured to electrically connect an external power supply and a battery to receive an external voltage to charge the battery;

a heating control unit, which is configured to electrically connect the battery and a heating element;

a temperature regulating circuit, which is configured to electrically connect the battery and the heating control unit, and comprises a main control unit and a stepless regulating device electrically connected with the main control unit, wherein the stepless regulating device is configured to be operated by a user to generate a stepless regulating signal within a preset regulating range, and the main control unit is configured to receive the stepless regulating signal to generate a heating control signal and output the heating control signal to the heating control unit, so that the heating control unit outputs a driving signal according to the heating control signal to drive the heating element to heat within a preset temperature range, wherein the driving circuit of the hand warmer further comprises a charge-discharge protection chip, an anode of the battery is configured to connect a power supply end VDD of the charge-discharge protection chip via a first protection resistor, a cathode of the battery is configured to electrically connect a driving end VT and a grounding end GND of the charge-discharge protection chip, a detection pin VM of the charge-discharge protection chip is grounded; and a capacitor is further connected between the cathode of the power supply and the power supply end VDD of the charge-discharge protection chip.

7. A driving circuit of a hand warmer, wherein the driving circuit of the hand warmer comprises:

a charging control circuit, which is configured to electrically connect an external power supply and a battery to receive an external voltage to charge the battery;

a heating control unit, which is configured to electrically connect the battery and a heating element;

a temperature regulating circuit, which is configured to electrically connect the battery and the heating control unit, and comprises a main control unit and a stepless regulating device electrically connected with the main control unit, wherein the stepless regulating device is configured to be operated by a user to generate a stepless regulating signal within a preset regulating range, and the main control unit is configured to receive the stepless regulating signal to generate a heating control signal and output the heating control signal to the heating control unit, so that the heating control unit outputs a driving signal according to the heating control signal to drive the heating element to heat within a preset temperature range, wherein the driving circuit of the hand warmer further comprises a charging protection circuit, the charging protection circuit is electrically connected with the battery and the main control unit and is configured to cut off the electrical connection between the battery and the temperature regulating circuit when detecting that the charging control circuit receives the external voltage, so that the temperature regulating circuit and the heating control unit stop operating when the battery is charged, wherein the charging protection circuit comprises a first switch, a second switch and a third switch, a first connecting end of the first switch is configured to connect the anode of the battery, a second connecting end of the first switch is configured to electrically connect the power supply end of the main control unit to output the operating voltage, a control end of the first switch is grounded via a first resistor, the control end of the second switch is configured to connect the charging control circuit via a second resistor to receive the external voltage, the first connecting end of the second switch is connected to the control end of the third switch, the second connecting end of the second switch is grounded, the first connecting end of the third switch is connected to the anode of the battery, the second connecting end of the third switch is connected to the control end of the first switch; the first switch is a PMOS tube, the second switch is an NPN triode, the third switch is a PNP triode; a diode is provided between the second connecting end of the third switch and the control end of the first switch; and a manual control switch button is provided between the first connecting end of the first switch and the anode of the battery.

* * * * *